Dec. 12, 1961    C. D. PETERSON    3,012,573
SAFETY DEVICE FOR GAS PRESSURE REGULATOR
Filed July 17, 1958
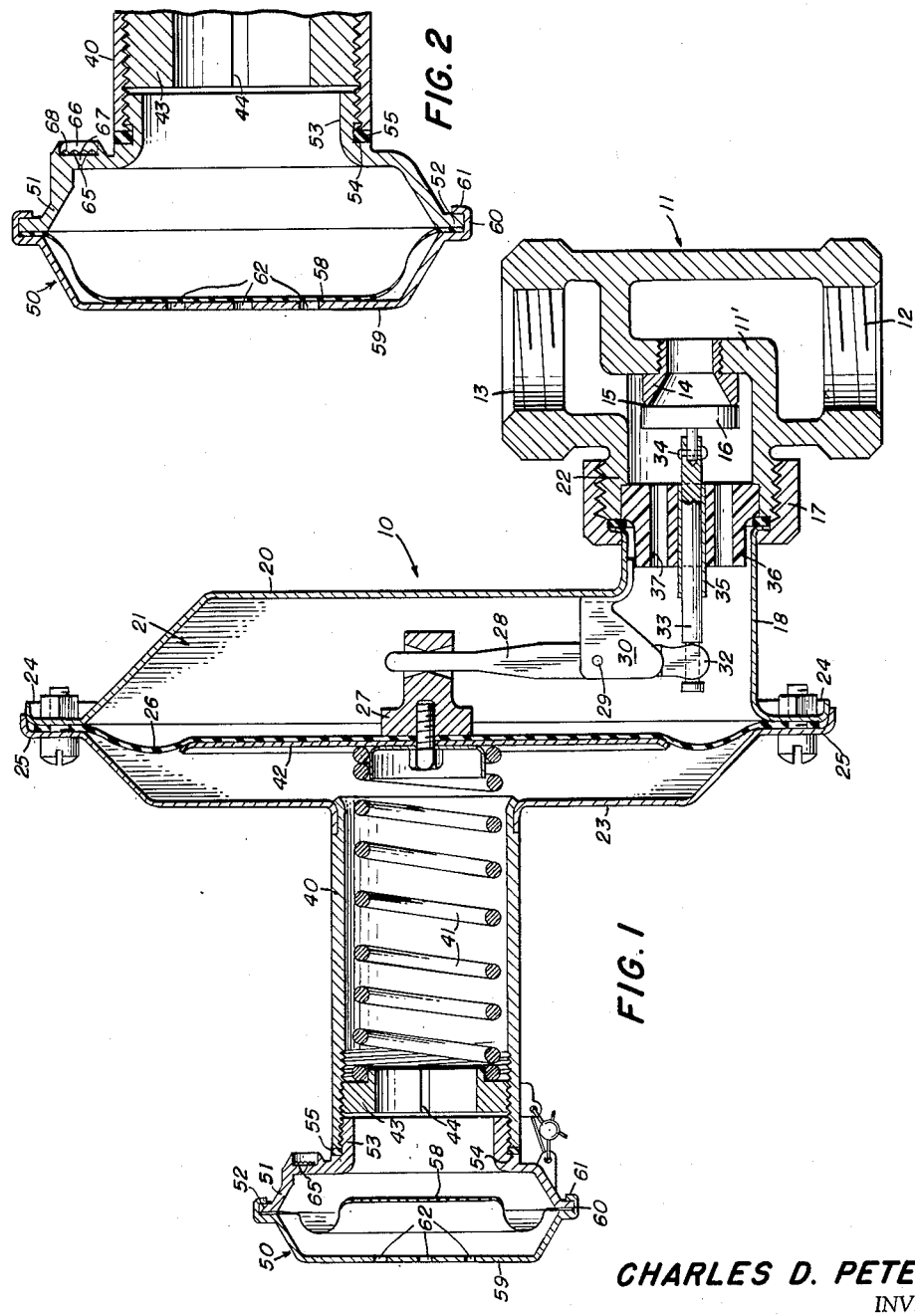
CHARLES D. PETERSON
INVENTOR
BY *Leech r. Radue*
ATTORNEYS United States Patent Office 3,012,573
Patented Dec. 12, 1961

3,012,573
SAFETY DEVICE FOR GAS PRESSURE REGULATOR
Charles D. Peterson, Dallas, Tex., assignor to Universal Controls Corporation, Dallas, Tex., a corporation of Texas
Filed July 17, 1958, Ser. No. 749,106
5 Claims. (Cl. 137—505)

This invention relates to a safety device for a gas pressure regulator and more particularly to expansible chamber means for the inactive face of the diaphragm of such regulator to enable it to operate in the usual manner under normal conditions and to prevent the escape of an unsafe quantity of gas from the regulator in the event of diaphragm leakage.

It is a general object of the present invention to provide a novel and improved safety device for a gas pressure regulator.

More particularly the invention contemplates an arrangement to maintain substantially atmospheric pressure on a regulator diaphragm "back" face under all normal conditions of operation while preventing dangerous gas escape from the regulator in the event of diaphragm rupture.

One specific object of the invention comprises the extension of the usual rigid chamber enclosing the diaphragm back face of a gas pressure regulator to include an extensible bellows device sensitive to changes in pressure in said chamber to adjust volume to maintain substantially atmospheric pressure therein.

Another object of the invention consists in the provision of means to limit the volume adjustment and prevent damage to the extensible device in the event of a diaphragm rupture.

Still another object consists in the provision of a minute breather opening in the extensible bellows device to achieve compensation for ambient temperature changes for proper back diaphragm pressure maintenance under all circumstances.

A further object of the invention consists in the arrangement of the extensible device to act sufficiently fast to prevent wide pressure fluctuations at the regulator outlet in spite of instantaneous changes in demand.

A still further object of the invention consists in the arrangement for applying the safety device to an existing regulator through the use of a mounting and connecting attachment to replace the usual regulator spring housing cap.

Other and further objects and features of the invention will be more apparent to those skilled in the art upon a consideration of the following specification and accompanying drawings, wherein is shown a single exemplary embodiment of the invention with the understanding that such changes and modifications may be made to the invention as fall within the scope of the appended claims without departing from the spirit of the invention.

In said drawings:

FIGURE 1 is a vertical central section of a gas pressure regulator fitted with one embodiment of the safety device of the present invention, illustrating the latter in a neutral position; and FIGURE 2 is a central longitudinal section through the safety device of FIGURE 1, shown on an enlarged scale, in the maximum extended position and illustrating the safety stop means therefor.

Gas pressure regulators, particularly in the sizes and types used in residences to reduce the pressure from that in intermediate or low pressure mains to one suitable for domestic applicances, have in recent years come under more stringent scrutiny by various regulatory bodies and safety commissions and increasingly higher standards have been applied to their construction and use. The usual domestic regulator has the inactive or back face of the valve-controlling diaphragm housed for protection, but this housing must be vented to maintain atmospheric pressure therein so as not to detrimentally affect the operation of the diaphragm. Thus if the diaphragm leaks, is torn, cracked or ruptured from any one of many causes gas is discharged from the housing vent. This is not particularly dangerous in outdoor installations although detection there is less likely. However, it is extremely dangerous in indoor installations from the standpoint of fire, explosion or asphyxiation, and most municipal authorities require outdoor venting. This requires the addition of a coupling unit to the back diaphragm housing and the installation of large diameter tubing or piping to the exterior where it must terminate in a safe location and be provided with a bug-proof and freeze-proof vent.

The cost of such modification of an existing installation or the labor and materials cost in a new installation may well be greater than the price of the regulator and hence a great deterrent to the use of the safety features. The device of the present invention can be added to an existing installation at low cost and is wholly at the regulator, while a new installation is even cheaper, since no added labor at the site is involved.

The safety is at least as great with the device of the present invention as with the more costly vented installations. Moreover, when used with low pressure mains, where the maximum pressure is less than that which will blow out pilots or main flames, if unreduced, the main reason for external discharge pipes is removed, i.e. the elimination of the relief valve in or around the regulator.

Referring now to the drawings there is shown, at 10, a gas perssure regulator of the type used between a low or intermediate pressure gas main and the service pipe to a dwelling or other place of modest quantity gas use. Shown at 11 is a T-fitting, the lower end 12 of which is adapted to be attached to a section of service pipe leading from the main, while the upper end 13 is for connection to the service pipe section delivering gas to the residence or the like. The center section of L-shaped partition 11¹ in the fitting is drilled to receive with a press-fit or threaded attachment as shown, the stem of valve seat member 14, the left end of the bore of which flares, as shown, providing a venturi as well as the sharp edged seat 15 for cooperation with valve disc 16 to control the flow of gas from 12 to 13 and thus regulate the outlet pressure.

A coupling nut 17 operable on a sput 18 struck out from the dished front housing 20 of the diaphragm case 21, serves to clamp and connect the latter to the stem 22 of T-fitting 11.

A companion or rear dished diaphragm housing shell 23 cooperates with shell 20, each of which is fitted with a radial flange 24, 25, and bolts secure these two flanges together over the edge of the flexible diaphragm 26 which is thus secured between them in a gastight manner. This diaphragm centrally mounts a fitting 27 which engages and cooperates with the long end of lever 28 pivoted at 29 on bracket 30 secured to the lower wall of shell 20. The shorter end of lever 28 has rounded end portion 32 which moves the valve stem 33, attached by the fork and rivet connection 34 to the carrier for valve disc 16. Valve stem 33 is guided for sliding in sleeve 35, carried in the bushing 36 mounted in the outer end of the T-stem and secured therein by the connection of the T to the sput 18 on the diaphragm housing. This bushing is provided with large perforations 37 through which gas from the outlet side of the T attains access to the chamber between the diaphragm and the front housing shell 20.

In accordance with the rate of use of gas and the condition of the valves leading to the various consuming devices in the residence, the pressure in the outlet side of the T tends to vary and this pressure acting on the front face of diaphragm 26 continually adjusts the position of valve disc 16 to control the regular flow through the fitting 11 to maintain the outlet pressure substantially constant.

The back diaphragm shell or cover 23 is fitted with an axially disposed, large diameter, tube 40 which houses the diaphragm spring 41 of helical configuration extending between backing plate 42 on the diaphragm 26 and an adjusting tubular nut 43 threaded into the upper end of the spring housing tube 40. The nut is adjustable, by a suitable spanner type tool engaging slots or projections such as 44 in the internal through bore of nut 43. Adjustment of the spring by rotation of this nut determines, within limits, the relationship of the outlet pressure to the inlet pressure in the T-fitting 12.

In the usual gas pressure regulator, which may vary in minor details but not greatly in function from the one defined as representative, means is provided to vent the chamber between the diaphragm and the back cover 23, whose principal purpose is to protect the rear face of the diaphragm as well as support the spring. For certain usages, such a vent may comprise an opening through any suitable portion of the cover 23, fitted with a bug-proof vent protector of known construction. Where the installation is indoors, a vent pipe or tube of metal or plastic connects the chamber above referred to to a suitable outdoor location, where the outlet may be fitted with a bug-proof vent protector, so that any gas which may escape through a rupture in diaphragm 26 may be vented outdoors for obvious safety reasons.

In any event, the standard practice has been to connect the back shell chamber to atmosphere at one place or another, for if it were tightly closed the confined body of air, of limited capacity, would seriously interfere with the operation and prevent effective pressure regulation because it would not permit either the rapid or extensive movement of the diaphragm necessary under certain circumstances, since the diaphragm would be working against compressed or rarefied air, depending upon its position in the housing.

In accordance with the present invention, however, it is possible to close this chamber, as has been demonstrated, and instead of the usual closure nut, not shown, screwed into the end of the spring tube 40 and preferably sealed to prevent tampering with the adjustment of nut 43, the end of the tube is closed and sealed by a second diaphragm housing 50. This housing comprises a die-cast front shell portion 51 of appropriate dish-shape, having a radial flange 52 and an extended neck or sput 53 externally threaded to be received in the threads of the spring housing 40 and having a radial area 54 to cooperate with gasket 55 and compress it against the end of tube 40 to provide a gas tight connection between the housing 50 and the spring housing 40, which with its shell 23 is gastight.

A suitable diaphragm 58 extends across the flange 52 and is covered by a pressed-metal, dished, rear cover 59 having a tubular flange 60 at its periphery which fits over the flange 52 and clamps the diaphragm edge against it. The outer portion is crimped over, as at 61, to maintain the connection. The main area of the rear cover is substantially flat and in its central area is provided with a group of breather holes (seven of about ⅛-inch diameter preferred) entirely through it as shown at 62. This maintains atmospheric pressure on the back face of diaphragm 58.

The diaphragm 58 is very thin, approximately .005 inch, and extremely flexible and is given a shape somewhat like that illustrated with a flat, central-section, which might be a little heavier and stiffer than the rest. The periphery is either thickened as shown or protected by a gasket and the center portion is connected to the periphery by a deep, double-fold arrangement whereby there is sufficient material in the diaphragm for good movement in either direction to compensate for movement of the regulator diaphragm. This permits it to be pressed completely against the walls of the closure cover 59, as illustrated in FIGURE 2, at which time the openings 62 are sealed with the heavier central section of the diaphragm. At the pressure of the gas which might be leaking through a break in the main diaphragm 26 there is insufficient force to rupture the cover-supported diaphragm 58 through the small holes 62, thereby providing against any gas leaking from the vents 62 and into the cellar, for instances, of a dwelling. Movement of the main diaphragm toward the right, as seen in FIGURE 1, will allow diaphragm 58 to move in that same direction to equalize the pressure in the chamber behind the regulator diaphragm and keep it constant so that no retarding effect opposes the action of spring 41.

The volume or capacity of the chamber for the auxiliary diaphragm 58 is adjusted to be such that movement of that diaphragm is adequate in either direction to compensate for the change in volume on the back face of diaphragm 26 under extreme conditions of movement thereof in either direction.

Diaphragm 58 is designed to assume initially an intermediate position, approximately that shown in FIGURE 1, but obviously changes in the ambient temperature, transmitted to the air behind diaphragm 26, could be sufficient to seriously upset the operation of the pressure regulator. So, too, would changes in the barometric pressure, which would act only on the exposed face of the diaphragm 58. Therefore, means is provided for slowly equalizing the pressures on the two sides of diaphragm 58, it being remembered that the left side is freely exposed to atmosphere and, as seen best in FIGURE 2, provision is made to expose the right side of diaphragm 58 to atmosphere through an extremely small port 65, seen at the upper right in that figure. In the manufacture of the part 51 by die-casting, the cylindrical, walled, cup-like depression 66 is formed near its outer edge. The bottom of this has an extension 67 of conical form but the final passageway 65 is drilled with an extremely fine drill of the order of 1/64 of an inch in diameter. Then a screen, as shown at 68, is inserted against the bottom of cup 66 and material of the walls thereof staked in to hold it in position.

The extremely fine passage 65 serves as a means of equalizing slowly the air pressure inside of the back casing of the regulator diaphragm with the atmospheric pressure on the outside. The hole is so small that in case of the main regulator diaphragm 26 cracking or otherwise leaking, the amount of gas escaping into a residential basement would not be sufficient, even over a long period of time, to produce an explosive mixture. On the other hand, there probably would be enough gas to produce an odor and cause an investigation, particularly with most of the natural gases which are now provided with a suitable odorant for such purposes.

It will be obvious that the auxiliary diaphragm device need not be attached to the spring housing tube, and indeed can be used with regulators having different spring mountings or even those using weights to oppose the pressure of the gas on the discharge side of the regulator. Clearly the housing for the auxiliary diaphragm can be mounted on and connected to the back diaphragm casing in any desired manner without in any respect detracting from its satisfactory operating characteristics.

It will be apparent that the invention provides a safety feature applicable to many types of pressure regulators for domestic gas systems, one that effects considerable savings in manufacturing and installation costs and one with no detrimental effects on the operation of the regulator under even the worst conditions. The cost, however, is very low, the life long and the attention required nil.

I claim:

1. A gas service pressure regulator comprising in combination, a valve body having a valve adapted to close a port therein, a diaphragm, front and back cases for said diaphragm, the first being connected to the outlet side of said body for diaphragm actuating gas pressure, a helical spring opposing movement of said diaphragm, a gas tight tube housing said spring and extending axially from and open to the interior of the back case, internal threads at the remote end of said tube engaged by a hollow nut for adjusting said spring, a housing having front and back dished shells, a thin, non-metallic corrugated diaphragm mounted between said shells, one of said shells having a sput engaged in said tube threads providing it with free access to the said tube and the other shell having free access to atmosphere.

2. The regulator of claim 1 in which said shell having access to said tube is vented to atmosphere through a passage of the order of 1/64-inch in diameter to maintain pressure balance within and without.

3. The regulator of claim 2 in which said passage is coned outwardly and covered by a fine mesh screen.

4. A gas pressure regulator of the low or intermediate inlet pressure type having in combination, a regulator valve, a main diaphragm exposed to the gas valve outlet pressure on its active side, an operating connection between said diaphragm and the said valve, a rigid, closed back cover for the inactive side of the diaphragm, a large diameter tube secured coaxially to the back cover, a spring in said tube arranged to load said diaphragm in valve opening direction, internal threads in said tube, a tubular nut threaded in said tube to adjust said spring, a housing comprising two dished shells, a thin, flexible, non-metallic bellows-type diaphragm clamped between said shells, one of said shells having a threaded sput engaged in said tube threads to support the housing and connect the space between the bellows diaphragm and said one shell to the space between the back cover and main diaphragm, means freely exposing the other side of said bellows diaphragm to atmosphere, said housing having adequate volume to compensate for movement of the main diaphragm when regulating gas flow to maintain approximate atmospheric pressure on the inactive side thereof.

5. The combination of claim 4 in which the said one of the housing shells is equipped with a minute passage to atmosphere to provide compensation for temperature and atmospheric pressure changes on the air between said diaphragms.

References Cited in the file of this patent

UNITED STATES PATENTS

| | | |
|---|---|---|
| 268,368 | Lacey | Nov. 28, 1882 |
| 2,407,761 | McPherson | Sept. 17, 1946 |
| 2,616,659 | Grahling | Nov. 4, 1952 |
| 2,620,087 | Peterson | Dec. 2, 1952 |
| 2,837,119 | Schwarz | June 3, 1958 |

FOREIGN PATENTS

| | | |
|---|---|---|
| 20,712 | Australia | May 26, 1930 |
| 1,125,443 | France | July 16, 1956 |